Dec. 18, 1923.

W. S. MASON 1,478,291

METALLIC VEHICLE WHEEL

Filed Dec. 18, 1920.

WITNESS.
John B. Dade.

INVENTOR.
William S. Mason.
by Wilkinson & Giusta
his ATTORNEYS

Patented Dec. 18, 1923.

1,478,291

UNITED STATES PATENT OFFICE.

WILLIAM S. MASON, OF NORRISTOWN, PENNSYLVANIA, ASSIGNOR OF ONE-THIRD TO CHARLES B. HARDING, OF LANSDOWNE, PENNSYLVANIA, AND ONE-THIRD TO HENRY FREDERICKS, OF PHILADELPHIA, PENNSYLVANIA.

METALLIC VEHICLE WHEEL.

Application filed December 18, 1920. Serial No. 431,653.

*To all whom it may concern:*

Be it known that I, WILLIAM S. MASON, a citizen of the United States, residing at Norristown, county of Montgomery, State of Pennsylvania, have invented certain new and useful Improvements in Metallic Vehicle Wheels; and I do hereby declare the following to be a full, clear, and exact description of the invention, such as will enable others skilled in the art to which it appertains to make and use the same.

This invention relates to improvements in vehicle wheels, and especially to certain advantageous features in the construction thereof.

In addition to the usual aims of simplicity and economy in manufacturing and maintenance, consistent with durability and general efficiency, it may be said that the primary object of the present invention is to provide for the facile assembly of the parts, with accuracy and structural tightness, while at the same time providing for the ready replacement of a buckled, distorted or otherwise defective spoke, or spokes, without materially affecting or disturbing the adjustment of the remaining spokes of the wheel structure as a whole.

Other objects and advantages of the detailed construction, assembly and functioning of the several elements of the improved combination will be so clearly apparent, as incidental to the following disclosure, that no useful purpose would be served in further enlarging upon them initially, and with these prefacing remarks, therefore, reference will be immediately had to the accompanying drawings, illustrating a practical embodiment of the improvements, in which drawings—

Figures 1, 2:
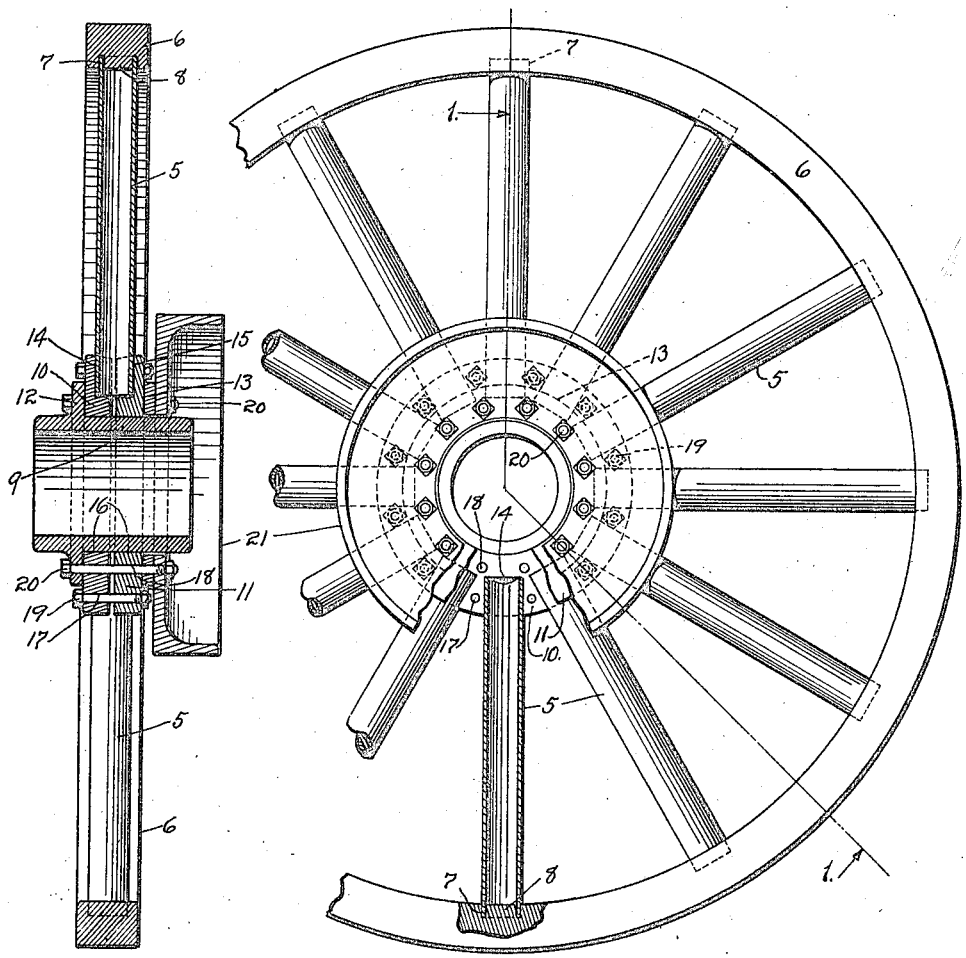
Figure 3:
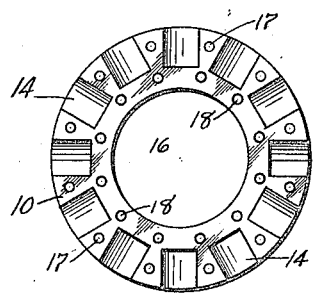

Figure 1 is a sectional view of the improved wheel, the section being taken along the angular line 1—1 of Fig. 2; Figure 2 is an elevational inside face view thereof, partly broken away and partly shown in section; and Figure 3 is an elevational inside face view of one of a pair of detachable hub encircling collars which provide cooperating non-integral spoke clamping plates or disks that are in reality independent of the axle box or hub proper.

Doubtless some of the features of my invention may be employed with wheels constructed partially at least of other material than metal, but it may be said at the outset that the improved wheel has been primarily devised as an "all-metal wheel," and for the purposes of lightness of structure and the saving of metal the spokes 5 thereof are preferably of tubular steel. It may also be said at the outset that the tubular spokes may be of other shapes in cross-section than cylindrical, if desired, but in the drawings I have illustrated them as cylindrical, and when of such form, the recesses in the felloe and the sockets of the clamping disks, for receiving the outer and inner ends of the spokes, as hereinafter referred to, are likewise of circular form. These, however, are details that may be altered in actual practice if found to be expedient.

The numeral 6 designates the metal felloe, the interior periphery of which provides an annular spaced series of countersunk circular recesses 7, each forming a cylindrical stud 8 that is housed by its complementary encompassing recess 7, which elements are equal in number to the number of spokes employed, being adapted to snugly receive the outer ends of the spokes in countersunk association, and the width of the channel of the recesses 7 being approximately the same as the thickness of the wall of the outer ends of the spokes, so that each stud 8 tightly fits within its encompassing spoke end.

The bearing hub or axle box proper preferably embodies a cylindrical sleeve 9 and, as it is shown in the drawings, may be of a sufficient length to extend substantially beyond each face of the wheel proper, the outer portion being provided towards its end with an integrally formed abutment flange 12, while the inner end is unobstructed and is adapted to be encompassed by a removable abutment annulus 13. It would obviously be equivalent, however, to shorten the bearing sleeve 9, so that its inner end would terminate substantially in line with the inner plane of the wheel, and have the annulus 13 formed integrally with a short cylindrical section adapted as a detachable capping continuation of the inner end of the bearing sleeve. In either event the elements 12 and 13, and the spoke clamping disks 10—11, are provided with complemental series of apertures to receive securing bolts as hereinafter referred to.

Each of the spoke clamping disks or detachable hub collars is provided with an annular series of semi-cylindrical recesses, 14 and 15 respectively, which are so formed around the inside faces thereof as to extend radially and open out on the periphery, the said collars being apertured, as at 16, for encompassing the sleeve 9 with their semi-cylindrical recesses complementally opposed in registration, to provide as many cylindrical spoke-end receiving sockets as there are spokes for the wheel.

An outer and an inner annular series of bolt holes are designated at 17 and 18, respectively, through each spoke clamping disk or detachable hub collar, for taking the securing bolts 19 and 20, and the bolts 20 not only pass through the said hub collars or independently spoke clamping disks 10—11 but also extend through the retaining abutment members 12—13 for the spoke clamping disks.

In some instances it may be found desirable or expedient to mount an auxiliary element at the central inside face of some wheels, which in the drawings I have illustrated more or less conventionally as a concave or dished annular member 21, which could serve as a gear wheel or other form of drive for the main wheel, when the latter is employed as a driving wheel or traction wheel, or the element 21 might be a brake band drum, or a member of a gear housing, or even serve other useful purposes.

At any event, where this element 21 is employed, it is centrally apertured to encompass the inner end of the axle bearing hub or sleeve 9, and is likewise provided with an annular series of bolt holes to take the bolts 20, which in this instance are long enough to extend at their inner ends substantially beyond the abutment annulus 13, as shown in the drawings. In fact, if desired, the outer ends of these bolts 20 may be threaded and likewise projected, for mounting a closed hub cap as commonly employed in finishing off the exterior appearance of wheels.

This latter detail, however, has not been shown in the drawings as it is believed to be obvious and is not essentially necessary anyhow, the invention primarily residing in my improved wheel structure substantially as set forth, either with or without the auxiliary element 21.

In the making up of the wheel it will be apparent that the felloe, the spokes and the self-centering inner spoke end clamping collars are rigidly assembled as a fixedly secured whole, quite independently of the hub proper or axle bearing member 9, and the spoke clamping collars are purposely dimensioned of such a substantial diameter that they are adaptable to be fitted to bearing hubs proper of any size, for association with larger or smaller axle ends.

This feature is considered to be of very material importance and it is believed that the ends attained thereby may only be accomplished by the use of the solid disk-like form of clamping collars as employed by my invention, without any axial cylindrical extensions or barrel members, as contradistinguished from somewhat analogous forms of spoke clamping members both or either of which have such barrel hub portion extensions that cannot be bored out at will to be adaptable for fitting to a larger sized axle end. With my disk-like or continuously planetary clamping collars, however, the latter may be formed initially with a comparatively small sized central aperture 16 which may later be bored out to a larger diameter, without weakening the structure, to take any size hub element proper, thus adapting the same wheel structure to be fitted to axle ends of varying increasing diameters.

The diameter of the sleeve 9 or hub element proper being determined upon, it only becomes necessary to fit my especial form of clamping collars 10—11 thereover and, with the long bolts 20 inserted through the complementary series of registering apertures in all of the elements 10—11—12—13, upon tightening up their nuts it will be obvious that the hub bearing member proper and its encircling spoke clamping collars, all of which are otherwise independently separable, are then rigidly secured together. Where the auxiliary element 21 is employed it is apparent that this is fitted over the threaded ends of the bolts 20 before applying their nuts.

Having thus disclosed a practical embodiment of my improvements, what I claim as new and patentable is:—

A wheel of the class described comprising a felloe, spokes, and a hub structure composed of a cylindrical bearing sleeve provided with an outwardly extending flange having a plurality of circumferentially spaced axially extending bolt holes; a pair of separable complementary flat spoke clamping discs, provided with central axial holes receiving said sleeve, said discs being also provided upon their complementary faces with a plurality of radially extending semi-cylindrical recesses constituting spoke end receiving sockets, said discs also having a set of axially extending bolt holes adjacent their inner circumference adapted to register with the holes in said flange, and a second set of axially extending bolt holes adjacent their outer circumferences intermediate adjacent sockets; a spacing annulus mounted upon said sleeve abutting one of said discs, provided with bolt holes adapted to align with said flange bolt holes; an annular member also mounted on said sleeve abutting said spacing annulus and provided with holes registering with the holes therein; and bolts passing through all of said holes and securing all of said members together.

In testimony whereof, I affix my signature.

WILLIAM S. MASON.